(12) United States Patent
Joshi et al.

(10) Patent No.: US 9,394,586 B2
(45) Date of Patent: Jul. 19, 2016

(54) RECOVERY OF RARE EARTH ELEMENTS AND COMPOUNDS FROM COAL ASH

(71) Applicant: Physical Sciences, Inc., Andover, MA (US)

(72) Inventors: Prakash B. Joshi, Andover, MA (US); Dorin V. Preda, Medford, MA (US); David A. Skyler, Methuen, MA (US); Anait Scherer, Somerville, MA (US); B. David Green, Methuen, MA (US); William J. Marinelli, Harvard, MA (US)

(73) Assignee: Physical Sciences, Inc., Andover, MA (US)

( * ) Notice: Subject to any disclaimer, the term of this patent is extended or adjusted under 35 U.S.C. 154(b) by 99 days.

(21) Appl. No.: 14/509,692

(22) Filed: Oct. 8, 2014

(65) Prior Publication Data

US 2015/0139871 A1    May 21, 2015

Related U.S. Application Data

(63) Continuation-in-part of application No. 13/864,677, filed on Apr. 17, 2013, now Pat. No. 8,968,688.

(60) Provisional application No. 61/625,292, filed on Apr. 17, 2012.

(51) Int. Cl.
*C22B 7/00*    (2006.01)
*C22B 59/00*   (2006.01)
*C22B 7/02*    (2006.01)
*C22B 3/22*    (2006.01)

(52) U.S. Cl.
CPC . *C22B 59/00* (2013.01); *C22B 3/22* (2013.01); *C22B 7/007* (2013.01); *C22B 7/02* (2013.01); *Y02P 10/234* (2015.11)

(58) Field of Classification Search
None
See application file for complete search history.

(56) References Cited

FOREIGN PATENT DOCUMENTS

RU    2293134 C1    2/2007

OTHER PUBLICATIONS

Joshi, P.B. and Skyler, D.A., "Recovery of Rare Earths from Coal Ash—Technology and Economics", Presentations to Dr. Victor H. Reis, Senior Advisor, Office of the Undersecretary of Energy for Science Department of Energy, Sep. 27, 2010, Dr. Nese Orbey, et al., University of Massachusetts, Lowell, Nov. 3, 2010 and Dec. 23, 2010.

(Continued)

*Primary Examiner* — Steven Bos
(74) *Attorney, Agent, or Firm* — Proskauer Rose LLP

(57) ABSTRACT

The coal ash can be sorted into groups of substantially unburned carbon and substantially burned carbon. The substantially unburned carbon or the substantially burned carbon can be magnetically treated to cause separation into a substantially magnetic portion and a substantially non-magnetic portion. The substantially magnetic portion or the substantially non-magnetic portion can be filtered into a substantially course portion and a substantially fine portion. The substantially coarse portion or the substantially fine portion can be treated with a mineral acid to form an aqueous mineral acid solution. The aqueous mineral acid solution can be extracted to form an organic solution that includes the rare earth salts. The organic solution can be mixed with water to form an aqueous solution that includes the rare earth salts. The rare earth salts can be separated from the aqueous solution.

19 Claims, 7 Drawing Sheets

(56) References Cited

OTHER PUBLICATIONS

Recovery of Critical Elements from Industrial Waste, Concept Paper submitted to the U.S. Department of Energy, Energy Efficiency and Renewable Energy Golden Field Office, DE-FOA-0000560, Innovative manufacturing Initiative, Sep. 21, 2011.

"A Low-cost Rare Earth Elements Recovery Technology", Physical Sciences Inc., Proposal #67152, Submitted to Nine Sigman, Jun. 17, 2011.

"A Low-cost Rare Earth Elements recovery Technology", Physsical Science Inc. Proposal #7361-073, Submitted to U.S. Environmental Protection Agency, May 3, 2011.

A Low-cost Rare Earth Elements Recovery Technology, A White Paper submitted in response to Broad Agency Announcement, BAA-DLASM-2011-01, National Defense Stockpile Research, Defense Logistics Agency (DLA), Strategic materials NDS research, Physical Sciences, Inc., WP12-09, Sep. 2, 2011.

Coal Ash: 130 Million Tons of Waste, CBS News, Apr. 15, 2010.

Seredin, V.V., "Rare Earth Element-Bearing Coals from the Russian Far East Deposits," Int. J. Coal Geology, vol. 30, 1996, pp. 101-129.

Hower, J.C., et al., Lanthanide, yttrium, and zirconium anomalies in the Fire Clay coal bed, Eastern Kentucky, International Journal of Coal Geology, vol. 39, 1999, p. 141-153.

Joshi, P.B., "Recovery of Rare Earth Elements from Coal Ash—Rationale and Approaches", Presentation to Mark Johnson, ARPE-E and Diana Bauer and Jennifer Li, DoE, Washington, DC, Feb. 9, 2011, Physical Sciences Inc. VG 11-027.

2008 Coal Combustion Product (CCP) Production & Use Survey Report, AM Coal Ash Assn., 2008.

USGS Coal Quality Database, National Coal Resources Data System, 2004, http://energy.er.usgs.gov/coalqual.htm, Printed Aug. 29, 2014.

Kentucky Coal Quality Database, univ. of Kentucky Center for Applied Energy Research, 2010, http://kgs.uky.edu/kgsweb/DataSearching/coalsearch.asp, Printed Aug. 29, 2014.

US 9,394,586 B2

RECOVERY OF RARE EARTH ELEMENTS AND COMPOUNDS FROM COAL ASH

CROSS-REFERENCE TO RELATED APPLICATIONS

This instant application is a continuation-in-part of U.S. patent application Ser. No. 13/864,677, filed on Apr. 17, 2013 and titled "Recovery of Rare Earth Elements and Compounds from Coal Ash,", which claims the benefit of and priority to U.S. provisional patent application No. 61/625,292, filed Apr. 17, 2012, the entire contents of which are incorporated by reference herein and owned by the assignee of the instant application.

GOVERNMENT RIGHTS

This invention was made with Government support under Contract No. N00014-13-P-1008 awarded by the Office of Naval Research and Contract No. EP-D-13-039 awarded by the U.S. Environmental Protection Agency. The Government has certain rights in the invention.

FIELD OF THE INVENTION

The invention relates generally to recovery of rare earth elements and/or compounds from coal ash.

BACKGROUND

Rare earth elements can be fundamental to emerging green energy technologies in the United States (e.g., permanent magnet motors for wind turbines and disk drives, hybrid car batteries, compact fluorescent lighting, and/or displays in all types of consumer/defense electronics), as well as other usages such as industrial catalysts for refining heavier crude oil, automobile catalytic converters, and/or as alloying elements. Presently, rare earth elements can be obtained through mining.

Coals from certain regions of the world can be particularly rich in rare earth elements, approaching a total concentration of about 1000 parts-per-million ("ppm"). The combustion of coal in power plants for energy generation concentrates non-volatile minerals in the ash by about ten times, to about 10,000 ppm, or on the order of approximately 1%. Coal ash can be the product of burning coal. Coal ash can be comprised of fly ash and bottom ash. Fly ash can be ash that rises with flue gases. Bottom ash can be ash that is found at the bottom of a furnace. Fly ash can be collected before the flue gases reach chimneys of power plants.

A method to extract rare earth elements from coal is desired. The United States alone produces on the order of 100 million metric tons of fly ash annually. Accounting for process yield and variability in rare earth element content, if rare earth elements are extracted from coal ash, a reasonable fraction of currently available fly ash (e.g., about 10-15%) can be adequate to meet rare earth elements demand in the United States.

SUMMARY OF THE INVENTION

Advantages of the invention include recovering rare earth elements from coal ash. Another advantage of the invention includes economical production of rare earth elements and/or compounds from alternative, non-mineral raw materials. Another advantage of the invention is the ability to build reliable production capabilities and/or supply chain for rare earth elements and/or byproducts. Another advantage of the invention is processing fly ash to recover rare earth materials, particularly heavier rare earths, more economically and energy-efficiently per kilogram of rare earth elements than from processing and extracting mineral resources. Another advantage includes the beneficiation of coal ash, which is an abundant waste material, for recovering economically useful and marketable industrial materials that include rare earth elements as a significant component. Another advantage includes energy efficient extraction of rare earth elements, which can save energy use by about 75% relative to conventional mining per unit weight of rare earth elements produced. Yet another advantage is the accompanying carbon dioxide ($CO_2$) emission can be lower than mining by about 75%. Still another advantage includes production of environmentally beneficiated ash cake, which can be free of hazardous elements.

In one aspect, the invention involves a method of recovering rare earth elements from coal ash. The method involves sorting the coal ash into groups of substantially unburned carbon and substantially burned carbon. The substantially unburned carbon or substantially burned carbon is magnetically treated to cause separation into a substantially magnetic portion and a substantially non-magnetic portion. The substantially magnetic portion or the substantially non-magnetic portion is filtered into a substantially course portion and a substantially fine portion. The substantially coarse portion or the substantially fine portion is treated with a mineral acid to form an aqueous mineral acid solution that contains rare earth element salts. The aqueous mineral acid solution is extracted to form an organic solution that includes the rare earth salts. The organic solution is mixed with water to form an aqueous solution that includes the rare earth salts and the rare earth salts (or rare earth elements) are separated from the aqueous solution.

The aspect described above can include one or more of the following features. In some embodiments, sorting the coal ash can include screening the coal ash to collect coal ash that is smaller than a first predefined size. Sorting the coal ash can also include performing froth floatation of the screened coal ash. The coal ash that does not float can be gathered.

In various embodiments, screening the coal ash can be done using a scalping screen. The substantially non-magnetic portion of the coal ash can be filtered by size. In some embodiments, cyclone separating removes coal ash that is smaller than a second predefined size. The substantially fine portion of the coal ash can be smaller than the second predefined size. The substantially fine portion of the coal ash can be removed and used in a cement substitute market.

In some embodiments, the substantially coarse portion of the coal ash is treated with a mineral acid. The mineral acid can be nitric acid.

In various embodiments, treating includes heating the mineral acid to approximately 90° C. The substantially coarse portion, the substantially fine portion, or both can be exposed to the mineral acid for at least one hour. Exposing the coal ash can include additional heating of a resulting solution formed when exposing the coal ash to the mineral acid to generate a more concentrated mixture.

In some embodiments, extracting the aqueous mineral acid solution also includes mixing the aqueous mineral acid solution with tributyl phosphate and kerosene. Extracting the aqueous mineral acid solution can also include removing the organic solution from the aqueous mineral acid solution such that the rare earth salts are substantially removed along with the organic solution. Extracting the aqueous mineral acid solution can further include performing a dry extraction, a liquid extraction, or any other combination. The dry extraction can be a Soxhlet extraction. The dry extraction can also include performing continuous extraction of rare earth salts with tributyl phosphate.

In various embodiments, mixing the organic solution includes performing multiple cycles of mixing the organic solution with water until a concentration level of rare earth salts in the aqueous solution is below a predetermined threshold. In other embodiments, magnetically treating can include ion exchange separation. Ion exchange separation leading to rare earth element mixtures can be converted to mixtures of rare earth oxides and rare metals for various applications such as catalyst, magnets, and phosphor applications.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

A method of processing coal ash can be used to recover rare earth elements in order to, for example, meet critical rare earth element materials needs. The method can employ a closed looped schema e.g., certain materials, such as aqueous mineral acid, can be reused rather than discharged as waste. Since materials are reused, the closed-loop schema can have a lower environmental impact than, for example, mining for rare earth elements.

The method can also allow exploitation of low grade sources of the rare earth elements. The method can utilize waste ash, e.g., ash that follows coal combustion, as a resource for rare earth elements. The method can allow beneficiating the waste ash while simultaneously recovering rare earth elements.

Rare earth elements principally include the lanthanide series of the periodic table, but the term can also incorporate scandium and yttrium that are not true lanthanides. Exemplary rare earth elements, include: lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), scandium (Sc) and yttrium (Y). Rare earth elements can include light rare earth elements, medium rare earth elements, and/or heavy rare earth elements. Exemplary light rare earth elements include Sc, La, Ce, Pr, Nd, and Pm. Exemplary medium rare earth elements include Sm, Eu, and Gd. Exemplary heavy rare earth elements include Tb, Dy, Ho, Er, Tm, Yb, Lu, and Y.

Rare earth elements that are recovered from coal can have a number of applications. For example, some of these coals contain Y, a heavy rare earth element that can be used in compact fluorescent light bulbs. The coals can also contain Nd, a light rare earth element that can be used in permanent magnet motors in hybrid vehicles, wind turbines, and computer disk drives. Other applications for rare earth elements can include, for example, use in aerospace components, high refractive index glass, flint, batteries, catalysts, polishes, lasers, x-ray machines and capacitors.

Figure 1:
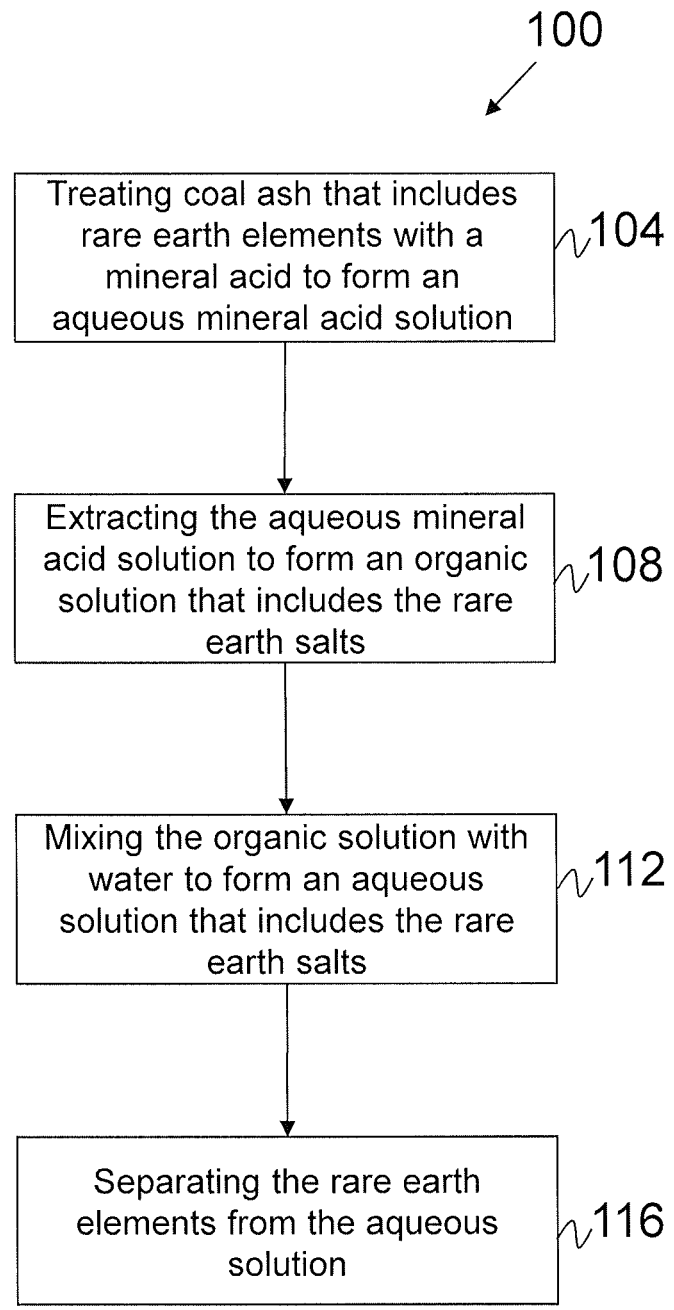
FIG. 1 is a flow diagram of a method for extraction of rare earth elements from coal ash, according to an illustrative embodiment of the invention.

FIG. 1 shows a flow diagram of a method 100 for extraction of rare earth elements from coal ash, according to an illustrative embodiment of the invention. The method 100 involves treating coal ash (e.g., mineral acid digestion) that includes rare earth elements (rare earth elements may be referred to as rare earth element salts) with a mineral acid to form an aqueous mineral acid solution (Step 104). The method also involves extracting the aqueous mineral acid solution to form an organic solution that includes the rare earth elements (Step 108). The method also involves mixing the organic solution with water to form an aqueous solution that includes the rare earth elements (Step 112). The method also involves separating the rare earth elements from aqueous solution (Step 116). The method 100 can be a solvent extraction process. In some embodiments, the solvent extraction process uses a mineral acid that can be recovered and recycled to extract the rare earth elements from coal ash.

In some embodiments, fly ash is used to extract the rare earth elements (as opposed to coal ash, which contains both fly ash and bottom ash). Although fly ash and coal ash are not necessarily the same, any of the preceding and/or foregoing methods applied to fly ash can be applied to coal ash and vice versa. In various embodiments, any of the preceding and/or foregoing methods applied to fly ash and/or coal ash can also be applied to bottom ash.

In some embodiments, the mineral acid is nitric acid. In various embodiments, the rare earth element is a rare earth nitrate and the aqueous mineral acid solution is an aqueous nitric acid solution. In some embodiments, the mineral acid is selected based on a specific application for the rare earth elements. For example, nitric acid (7M) can be used in a PUREX (Plutonium—Uranium Extraction) process (e.g., a process for the reprocessing of spent nuclear fuel to separate uranium and plutonium from the fission products and from one another) because the nitric acid can be used to dissolve used nuclear fuel. In some embodiments, the mineral acid is different from the hydrochloric and/or sulfuric acid mineral acids that are typically used for rare earth element extraction directly from mined minerals.

Figure 2:
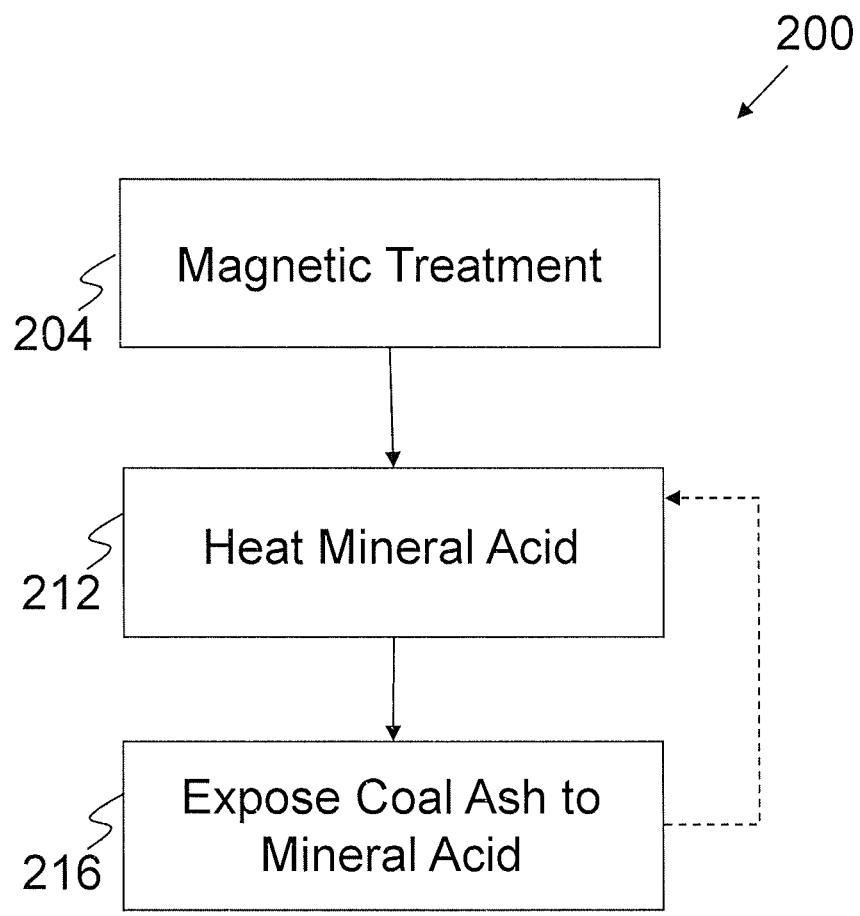
FIG. 2 is flow diagram of a method for treatment of coal ash, according to an illustrative embodiment of the invention.

FIG. 2 shows a flow diagram for a method 200 for the treatment of coal ash (e.g., Step 104 as described above in FIG. 1), according to an illustrative embodiment of the invention. The method 200 involves preprocessing the coal ash (Step 204). The preprocessing can be performed to concentrate the coal ash and can be either a physical preprocessing or a chemical preprocessing. Concentrating the coal ash can involve exposing the coal ash to magnetic treatment (e.g., magnetic separation). Magnetic separation is a physical preprocessing that can create a magnetic fraction that includes a substantially magnetic fraction and a substantially nonmagnetic fraction. Other types of preprocessing of the coal ash can occur, including other physical preprocessing, such as sieving (e.g., separating out a particle size range that does not contain the rare earth elements), and/or chemical preprocessing, such as froth floatation (e.g., modifying the surface properties of rare earth elements that containing certain compounds such that the rare earth elements float to the top of a preprocess tank or sink to the bottom of the tank (reverse floatation)).

Magnetic treatment can maximize efficiency of extracting the rare earth elements from coal ash by, for example, passing the coal ash through a magnetic separator before chemical processing. Certain types of coal ash can contain significant concentrations of magnetic iron oxides. For example, coal ash created from coals mined in Kentucky and/or countries such as Bulgaria can be particularly rich in magnetic iron oxides. By knowing which oxide is likely concentrated in a particular type of coal ash, magnetic separation can be used to concentrate the rare earth elements (e.g., produce a substantially magnetic portion of coal ash). For example, if the rare earth elements found in fly ash are tied into magnetic spinal/glass structures, then the rare earth elements can be separated into the magnetic fraction. If the rare earth elements found in fly ash are not tied into magnetic spinal/glass structures, then the rare earth elements, which exist in their oxide forms in the coal ash, can separate into the non-magnetic fraction. Sampling and testing can be done to determine whether the rare earth elements are in the magnetic or non-magnetic fractions by, for example, using glow discharge mass spectroscopy. Magnetic structures used to facilitate the magnetic separation can include magnetite ($Fe_3O_4$), hematite ($Fe_2O_3$), and/or other iron oxides such as gamma-$Fe_2O_3$ or maghemite.

The method 200 also involves heating a mineral acid (Step 212). The mineral acid can be a volume of 3 Normal (N) mineral acid. The mineral acid can be heated to approximately 90° C. In some embodiments, the mineral acid can be heated at any temperature between 60° C. and 95° C. The method 200 also involves exposing the coal ash to the mineral acid (Step 216). In some embodiments, the coal ash is exposed to the mineral acid for at least one hour. Exposing the coal ash to the mineral acid can concentrate the amount of rare earth elements that are found in the coal ash. In some embodiments, after the coal ash is exposed to mineral acid, the coal ash is heated and exposed to the mineral acid again (e.g., repeat Steps 212 and 216, respectively). In various embodiments, the number of times the coal ash is heated and exposed to mineral acid can be 1, 2, 3, or any number of times. The type of rare earth element or coal ash source can determine the number of times the coal ash is heated and exposed to mineral acid. Additional heating (e.g., at a higher temperature and/or heating for a longer duration) of the mixture of the mineral acid and coal ash can generate a more concentrated mixture. A more concentrated mixture can contain more rare earth element then would occur if the additional heating was not applied. A resulting product of Step 216 can include an aqueous mineral acid solution, ash cake and gas.

Figure 3:
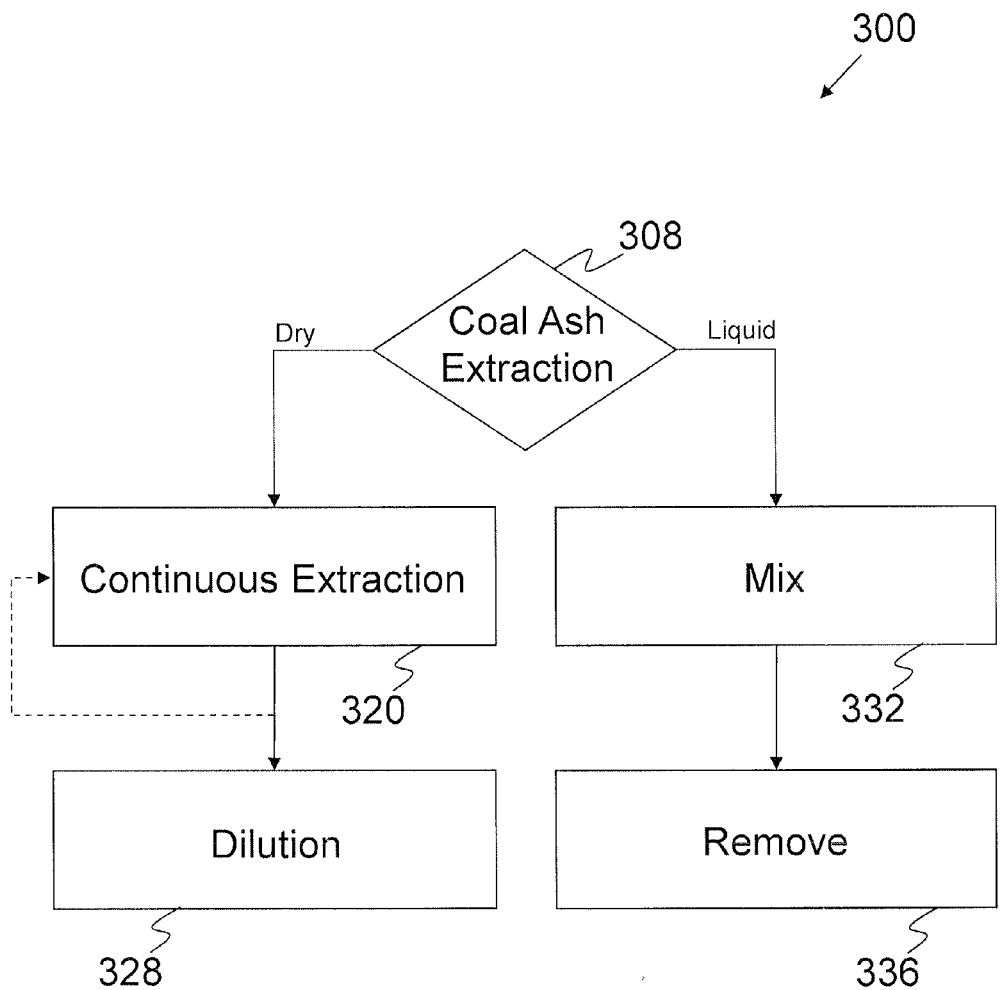
FIG. 3 is a flow diagram of a method for extraction of aqueous mineral acid solution, according to an illustrative embodiment of the invention.

FIG. 3 shows a flow diagram for a method 300 for the extraction of aqueous mineral acid solution, according to an illustrative embodiment of the invention (e.g., Step 108 as described above in FIG. 1). The method 300 involves extracting treated coal ash (Step 308). Treated coal ash can be the product of procedures such as Step 104 or method 200. The treated coal ash can include an aqueous mineral acid solution, ash cake and/or gas. The method 300 can involve mixing the aqueous mineral acid solution from the treated coal ash with tributyl phosphate and kerosene and removing the organic solution from the aqueous mineral acid solution such that rare earth salts are substantially removed with the organic solution. In some embodiments, solutions such as ionic liquids, pivaloyltrifluoroacetone (HA), N-methyl-N-phenyl-1,10-phenanthroline-2-carboxamide (MePhPTA), 1,4,10,13-Tetrathia-7,16-diazacyclooctadecane (ATCO) and/or ATCO binary extraction systems containing lauric acid can be used to mix with the aqueous mineral acid solution from the treated coal ash instead of tributyl phosphate and kerosene.

Treated coal ash, such as the product of procedures such as Step 104 or method 200, can be subjected to an extraction method in Step 308. The extraction method can be a dry extraction, a liquid extraction or a combination of the dry extraction and the liquid extraction. The dry extraction can be done using Soxhlet extraction. The dry extraction can include the pre-concentration of the aqueous mineral acid solution such that a higher concentration of rare earth elements is present in the aqueous mineral acid solution. The pre-concentration can be performed in any manner known to those of skill in the art, including drying, which can enable, for example, continuous extraction of rare earth elements from dry rare earth salt concentrate and continuous recovery/recycling of tributyl phosphate. In some embodiments, to minimize the amount of tributyl phosphate used in the extraction process, tributyl phosphate can be recovered after the extraction process and recycled in a future extraction process. This approach can have economic and environmental benefits. Other steps to further concentrate the rare earth salt can be done to, for example, obtain higher yield efficiency.

In some embodiments, if dry extraction is used, the method 300 also involves continuously extracting (Step 320). In Step 320, rare earth salts can be extracted from the aqueous mineral solution of treated coal ash by capturing rare earth salts that are carried off in vapors formed by boiling tributyl phosphate mixed with the aqueous mineral solution. Mixing the aqueous mineral solution and tributyl phosphate can create a solution containing an organic solution and a mineral solution. In some embodiments, the vapors pass through an extraction chamber. The extraction chamber can separate the rare earth salts from the vapors by allowing only the vapor to pass through to a condenser. The rare earth salts can be collected in a ceramic or tissue paper thimble. The vapors that have passed through the extraction chamber can be converted back into the aqueous mineral solution at the condenser. The aqueous mineral solution collected at the condenser can be reintroduced and re-boiled.

Step 320 can be repeated until a threshold for an amount or concentration of extracted rare earth salts is met. The threshold can be, for example, an amount (e.g., mass/weight) of extracted rare earth salt or a concentration of rare earth salt in the collected aqueous mineral solution. Step 320 can also be performed for a pre-determined period of time. The period of time can be, for example, minutes, hours, days, etc. In some embodiments, the period of time can be a function of a rare earth element concentration in the organic solution. Performing Step 320 multiple times can be desired to ensure that a desired amount of rare earth salts is extracted from the aqueous mineral solution. If dry extraction is used, the method 300 can also involve diluting (Step 328). In some embodiments, the organic solution formed in Step 320 is diluted using kerosene.

In various embodiments, if liquid extraction is used, the method 300 involves mixing (Step 332). The aqueous mineral acid solution of treated coal ash can be mixed with tributyl phosphate and kerosene. Mixing the aqueous mineral acid solution can create an aqueous mineral solution that contains little to no rare earth elements and an organic solution that contains rare earth elements. If liquid extraction is used, the method 300 can also involve removing the organic solution (Step 336). In some embodiments, the organic solution is removed from the aqueous mineral acid.

In various embodiments, the volume of tributyl phosphate and kerosene used in Step 332 is equal to the volume of aqueous mineral acid solution. In various embodiments, the volume of tributyl phosphate and kerosene used in Step 332 is equal to a predetermined amount that is greater than the volume of the aqueous mineral acid solution. The predetermined amount can be equal to any integer. For example, the predetermined amount can be equal to 9, rendering the total volume used in Step 332 to be 10× the volume of aqueous mineral acid solution. In some embodiments, the volume of tributyl phosphate and the volume of kerosene are equal. In various embodiments, the total volume of tributyl phosphate and kerosene is equal to the predetermined amount greater than the volume of aqueous mineral acid solution (including situations where the predetermined amount is 1; e.g., when the volume of aqueous mineral acid solution is the same as the volume of tributyl phosphate and kerosene).

The initial concentrations of rare earth elements or salts in the coal ash mineral acid extract can affect an extraction efficiency of the rare earth element recovery process, particularly in the efficiency-limited extraction into tributyl phosphate/kerosene steps, such as in Step 332. For example, a six to ten fold increase in the initial concentration can increase the extraction efficiency by over two-fold, depending on the specific rare earth elements found in the coal ash mineral acid extract. For example, the coal ash mineral acid extract can be concentrated to dryness and then re-dissolved in 3 Molar (M) mineral acid. In addition, the extraction into tributyl phosphate/kerosene steps, as described above, can be stirred continuously overnight, followed by a phase separation to improve the efficiency of extraction. Continuous stirring can yield greater chances of removing all of or a significant portion of the rare earth elements from the aqueous mineral solution, such that the organic solution can contains all of or a significant portion of the rare earth elements that were originally in the aqueous mineral solution.

In some embodiments, an efficiency of the extraction into tributyl phosphate/kerosene steps can be increased by adding three times a volume of 80/20 tributyl phosphate/kerosene (e.g., a mixture with a volume made up of 80% tributyl phosphate and 20% kerosene) to the aqueous mineral acid solution. For example, using an initial concentration of 2× of the aqueous mineral acid solution prior to extraction into a 50-50 wt % tributyl phosphate/kerosene mixture may not have an effect on the efficiency of the rare earth element extraction. However, increasing the concentration of the aqueous mineral acid solution after treating coal ash with mineral acid and before extraction into tributyl phosphate/kerosene by evaporation with water can increase the concentration by 6× to 10× over the baseline, depending on the specific rare earth elements found in the coal ash. For example, the concentration of aqueous mineral acid solution can be increased by adding three times the volume of tributyl phosphate/kerosene to the aqueous mineral acid solution (e.g., a 80-20 wt % mixture with a volume made up of 80% tributyl phosphate/kerosene and 20% aqueous mineral acid solution).

This process of concentrating the aqueous nitrate solution by evaporation can significantly increase the extraction efficiency, particularly with respect to the heavy rare earth elements yttrium and dysprosium and also for the light rare earth elements such as samarium. To improve the extraction efficiency further, the initial concentration can be further increased by water evaporation. Evaporation can be used all the way to dryness (e.g., all water has been evaporated).

In addition, the extraction into tributyl phosphate/kerosene steps, such as in Step 320, can be stirred continuously overnight, followed by phase separation to improve the efficiency of extraction.

A product of method 300 can include an organic solution that includes rare earth salts and thorium salts, and an aqueous mineral acid solution with rare earth salts and thorium salts removed (e.g., a second aqueous mineral acid solution different from the aqueous mineral acid found in the resulting product of Step 216). Other hazardous element salts can be removed as a result of method 300. In some embodiments, the second aqueous mineral acid solution is distilled to recover mineral acid. The recovered mineral acid can be recycled and used to treat coal ash. Recycling mineral acid can contribute to making the recovery of rare earth elements more economical. The product of method 300 can result from either dry extraction or liquid extraction.

Figure 4:
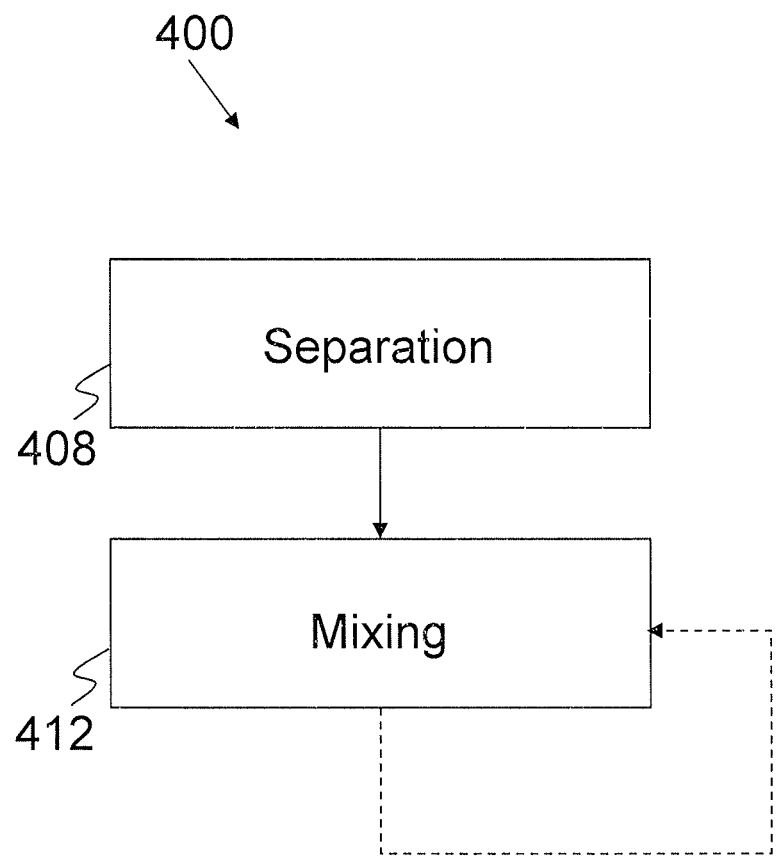
FIG. 4 is a flow diagram of a method for mixing organic solution, according to an illustrative embodiment of the invention.

FIG. 4 shows flow diagram for a method 400 for mixing organic solution, according to an illustrative embodiment of the invention (e.g., Step 112 as described above in FIG. 1). The method 400 can involve separating (Step 408). A solution, such as the product of method 300, can be introduced into the method 400. In Step 408, organic solution can be separated from other types of solution in the solution introduced into method 400 (e.g., an aqueous mineral acid solution). The organic solution that is separated in Step 408 can include rare earth salts. Step 408 can use any type of liquid separation method, including phase separation, evaporation, and/or other similar methods.

Phase separation can be conducted in a separator where organic solution separates to the top of the mixture and the aqueous solution separates from the organic solution to the bottom of the mixture. The separated organic solution can be re-extracted into water or re-extracted with dilute mineral acid to increase an extraction efficiency. The liquid used for re-extraction can be selected based on a determination of which liquid yields a better extraction efficiency. The organic solution that includes thorium salts and aqueous solutions that includes rare earth salts only can be separated from one another after re-extraction.

In some embodiments, the method 400 also involves mixing (Step 412). The organic solution can be mixed with water to form an aqueous solution with rare earth salts and organic solution without rare earth salts. The aqueous solution can be removed resulting in a solution that is substantially organic solution. In some embodiments, a salt concentration check is performed on the substantially organic solution. If the substantially organic solution contains a concentration level of rare earth salts above a predefined threshold, Step 412 can be repeated. Step 412 can be repeated as many times as needed (e.g., until the salt concentration of the substantially organic solution is below the predefined threshold). The predefined threshold can be a ratio of the salt concentration in the organic solution versus the salt concentration in the aqueous solution. In some embodiments, the ratio can be 1:10 or 1:100. The ratio can also be dependant on the type of rare earth salt that is being mixed. The threshold can also be dependant on whether it is monetarily worth extracting the rare earth slats at low concentrations.

Figure 5:
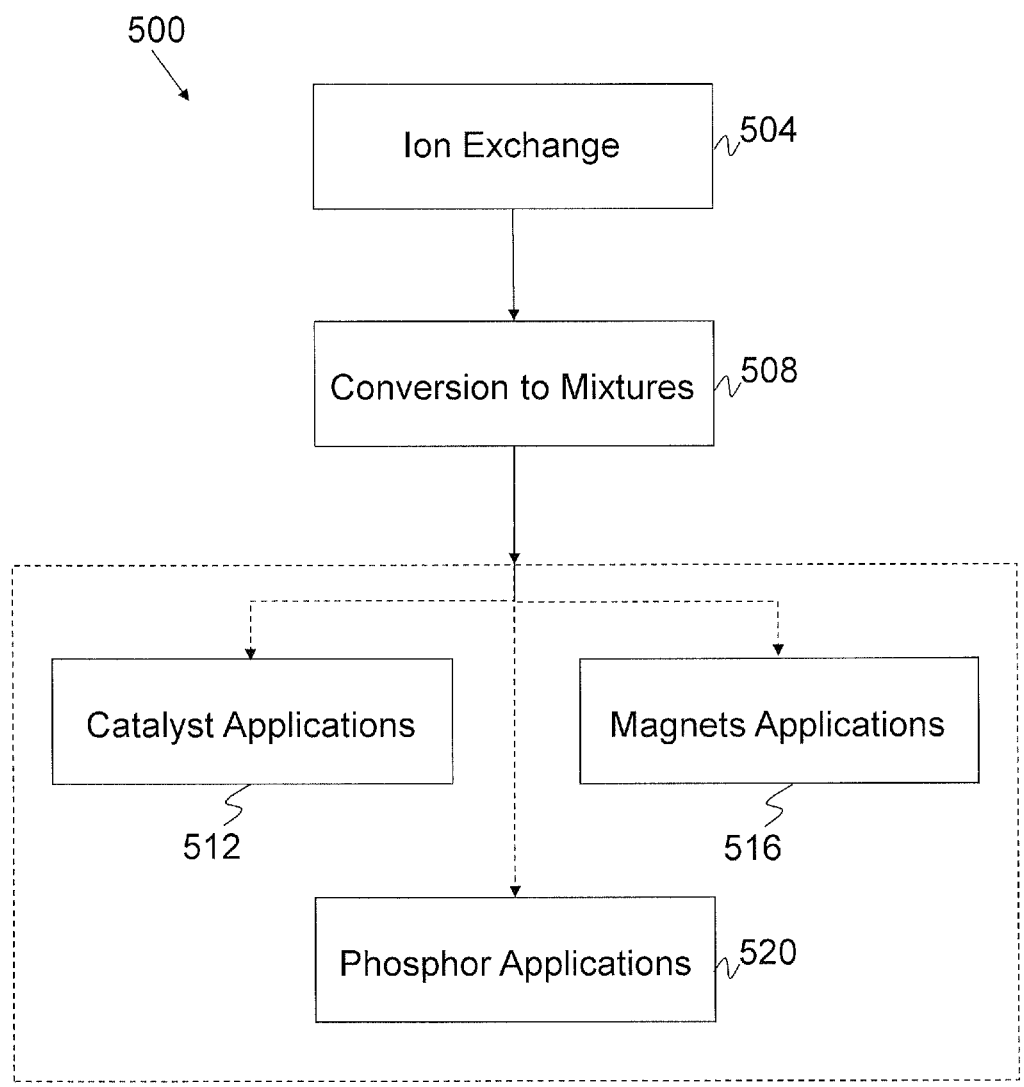
FIG. 5 is a flow diagram of a method for separation of rare earth elements, according to an illustrative embodiment of the invention.

FIG. 5 shows a flow diagram for a method 500 for separation rare earth elements, according to an illustrative embodiment of the invention (e.g., Step 116 as described above in FIG. 1). In some embodiments, the method 500 involves ion exchange (Step 504). Rare earth salts can be separated from an aqueous solution using ion exchange. Ion exchange separation can only be used for the separation of rare earth elements from mixtures that contain small amounts of rare earth elements. Ion exchange can use anion or cation exchange.

The method 500 can also involve converting the rare earth salts into mixtures in (Step 508). These mixtures can include rare earth oxides or rare earth metals. The mixtures can include pre-selected nitrates suitable for specific applications. Specific applications can include catalyst applications 512, magnets applications 516 and phosphor applications 520. In some embodiments, the process 500 separates the rare earth nitrites into individual rare-earth nitrates, such as Y, La, Ce, Nd, Dy, etc.

In some embodiments, ion exchange also includes concentrating the aqueous solution to dryness and then dissolving dried solution in a solution containing 5% 7M mineral acid and 95% methanol. The dried salt solution can be loaded into an ion exchange column where it can be washed with a solution containing 5% 7M mineral acid and 95% methanol before undergoing ion exchange separation. In various embodiments, dried salt solutions enriched in heavy rare earth elements are eluted with a solution containing 55% 7M mineral acid and 55% methanol. Dried salt solutions enriched in light rare earth elements can be eluted with water.

The separation of salt mixtures into various rare earth elements or rare earth salts forms instead of into specific rare earth oxides can have several advantages. Going directly from an aqueous solution with rare earth salts to rare earth oxides can require heating at high temperatures (e.g., about 700° C.) for a significant amount of time (e.g., about 1 hour). This high temperature process can require a significant amount of energy. These various rare earth salt forms can later be converted into separated forms of oxides but only if necessary. If an application does not require a specific oxide, there can be an energy savings. An energy savings can amount to 1,200 J/g. In addition, ion exchange can remove other metal nitrate contaminants from the nitrate mixtures.

Process parameters (e.g., time, temperature, concentration) are nominal values and can be optimized by one of ordinary skill in the art to improve the yields for rare earth elements from coal ash, depending on, for example, the concentration of rare earth elements in the coal ash.

Ash cake, or ash remainder, that can be formed in the process of recovering rare earth elements (e.g., the solid residue after mineral acid digestion) can be free of hazardous elements such as arsenic, cadmium, and thorium (e.g., hazardous elements are removed from the ash cake in the process of recovering rare earth elements). Coal ash that does not go through the process of recovering rare earth elements can present an environmental hazard due to the presence of radioactive thorium and toxic elements such as, for example, arsenic and cadmium. The ash cake formed in this process as a by product can be more environmentally friendly and therefore can be remediated or used in applications such as a building or road construction material. For example, the ash cake can be used as a Portland cement substitute in concrete. In some embodiments, toxic elements, such as arsenic, are removed during mineral acid digestion steps (e.g., Step 600, as described below). In other embodiments, radioactive elements, such as thorium, are removed during re-extraction (e.g., Step 620, as described below).

Figure 6:
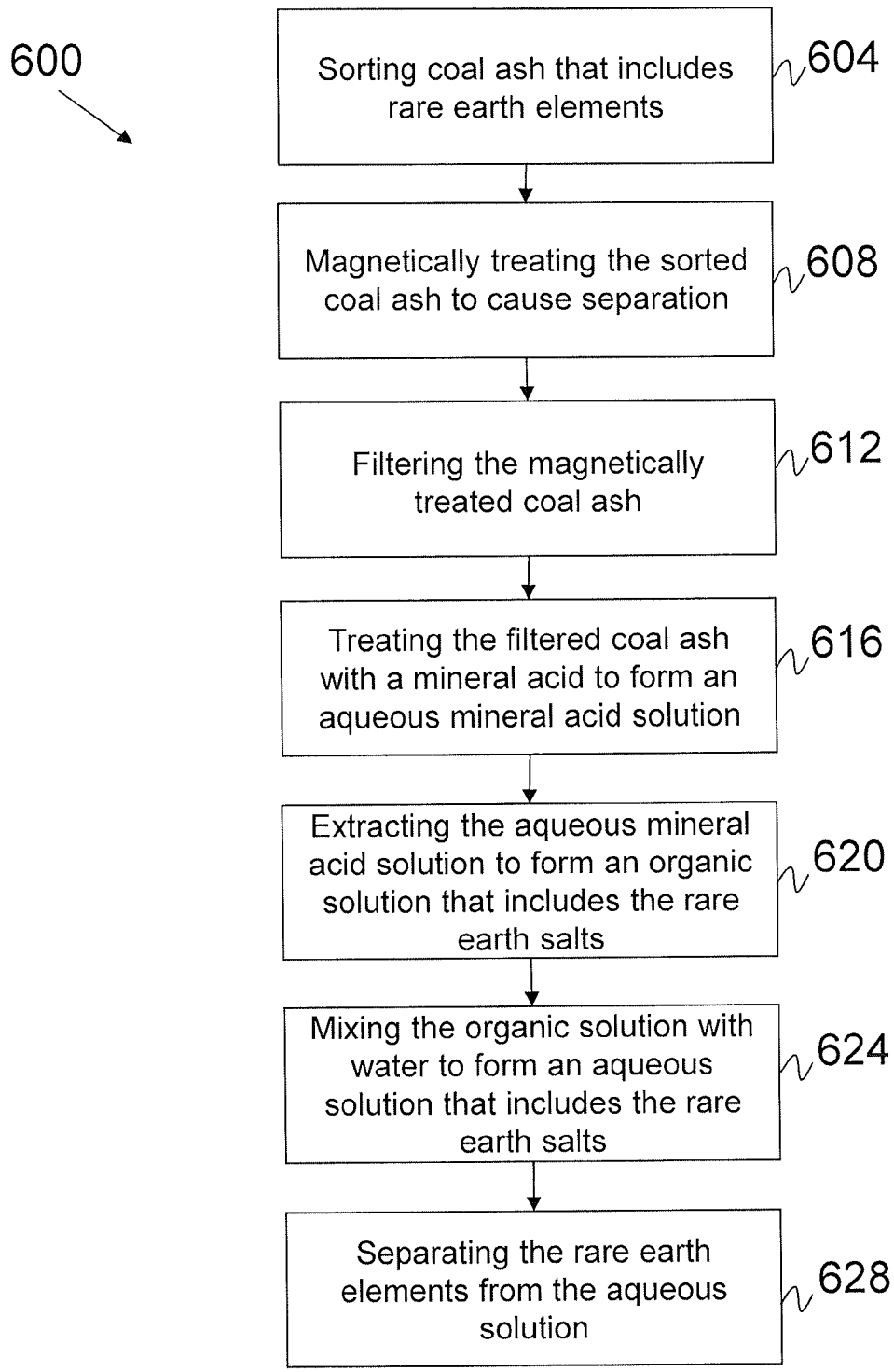
FIG. 6 is a flow diagram of a method for extraction of rare earth elements from coal ash, according to an illustrative embodiment of the invention.

FIG. 6 shows a flow diagram of a method 600 for extraction of rare earth elements from coal ash, according to an illustrative embodiment of the invention. The method 600 involves additional steps to increase the concentration of rare earth elements as described by method 100 (e.g., the method 600 is the method 100 plus additional steps). Additional steps can be physical or chemical methods. These additional steps can increase the efficiency of the chemical extraction or enrichment of fly ash. Concentration of rare earth elements can be higher within aluminum, non-magnetic iron, or alunimosilicate glass. In various embodiments, the increase in efficiency can be as much as 5 times or more.

The method 600 involves sorting coal ash that includes rare earth elements (Step 604). In some embodiments, Step 604 sorts coal ash into groups of substantially unburned carbon and substantially burned carbon. Groups of substantially unburned carbon can be a mix of unburned and burned carbon in which there is more unburned carbon than burned carbon. Groups of substantially burned carbon can be a mix of unburned and burned carbon in which there is more burned carbon than unburned carbon. In some embodiments, groups of substantially unburned carbon contains 80% or more unburned carbon in a mixture of unburned and burned carbon. In various embodiments, groups of substantially burned carbon contain 80% or more burned carbon in a mixture of unburned and burned carbon. Additional details regarding Step 604 are described below by method 700.

The method 600 also involves magnetically treating the sorted coal ash to cause separation (Step 608). Step 608 can separate the coal ash into a substantially magnetic portion and a substantially non-magnetic portion. In some embodiments, the proportion of the substantially magnetic portion to substantially non-magnetic portion can be 80% or more. The proportion of the substantially magnetic portion to substantially non-magnetic portion can depend on the type of material that makes up the substantially magnetic and the substantially non-magnetic portions. The proportion of the substantially magnetic portion to substantially non-magnetic portion of a type of ash can also depend on where the coal originated from, in which coal from certain regions of the world may yield more or less substantially magnetic portions. For example, ash from one region can yield an approximate 10% substantially magnetic portion, whereas ash from another region can yield an approximate 35% substantially magnetic portion. The separation can be done using a magnet on the sorted coal ash to attract the substantially magnetic portion. Other forms of magnetic treatment can include any methodology using an electromagnetic field to draw out (or separate) substantially magnetic material from non-substantially non-magnetic material.

The method 600 also involves filtering the magnetically treated coal ash (Step 612). Step 612 can filter the magnetically treated coal ash by size. For example, coal ash can be separated by ash that is greater than 75 microns, less than 25 microns and 25-75 microns. Filtering of Step 612 can cause coal ash to separate into a substantially course portion and a substantially fine portion. Filtering of the magnetically treated coal ash can be done using a cyclone separator.

In some embodiments, the cyclone separator removes coal ash that is smaller than a predefined cyclone separator size. For example, the predefined cyclone separator size can be in the range of +500 mesh, +200 mesh, +60 mesh, +75 mesh, −60 mesh, −75 mesh, −200 mesh and −500 mesh. Fine coal ash can be smaller than the predefined cyclone separator size. Course coal ash can contain more crevices to hold rare earth elements.

In some embodiments where the coal ash is separated into a substantially fine portion, the substantially fine portion of coal ash is removed and used in a cement substitute market (e.g., the substantially fine portion of coal ash can be sold to be used as an ingredient or component for cement). The substantially fine portion can be mixed with water and evaporated to create pozzolanic fine ash. Pozzloanic fine ash contains aluminosilicates and other compounds which can be substitutes for concrete. The substantially course portion of coal ash can be the portion of the coal ash that is treated with mineral acid (e.g., as in Step 616). Using coal ash as a cement substitute can lower cost for cement manufacturers as well as global $CO_2$ emissions, which is a by-product of the cement manufacturing process.

The method 600 also involves treating filtered coal ash (e.g., mineral acid digestion) with a mineral acid to form an aqueous mineral acid solution (Step 616). The method also involves extracting the aqueous mineral acid solution to form an organic solution that includes the rare earth elements (Step 620). The method also involves mixing the organic solution with water to form an aqueous solution that includes the rare earth elements (Step 624). The method also involves separating the rare earth elements from aqueous solution (Step 628). The method 600 can be a solvent extraction process. In some embodiments, the solvent extraction process uses a mineral acid that can be recovered and recycled to extract the rare earth elements from coal ash.

In some embodiments, Step 616 is the same as Step 104 as described above in FIG. 1. Namely, Step 616 can involve treating coal ash (e.g., mineral acid digestion) that includes rare earth elements with a mineral acid to form an aqueous mineral acid solution. Step 620 can be the same as Step 108 as described above in FIG. 1. Namely, Step 620 can involve extracting the aqueous mineral acid solution to form an organic solution that includes the rare earth elements. Step 624 can be the same as Step 112 as described above in FIG. 1. Namely, Step 624 can involve mixing the organic solution with water to form an aqueous solution that includes the rare earth elements. Step 628 can be the same as Step 116 as described above in FIG. 1. Namely, Step 628 can involve separating the rare earth elements from aqueous solution.

Figure 7:
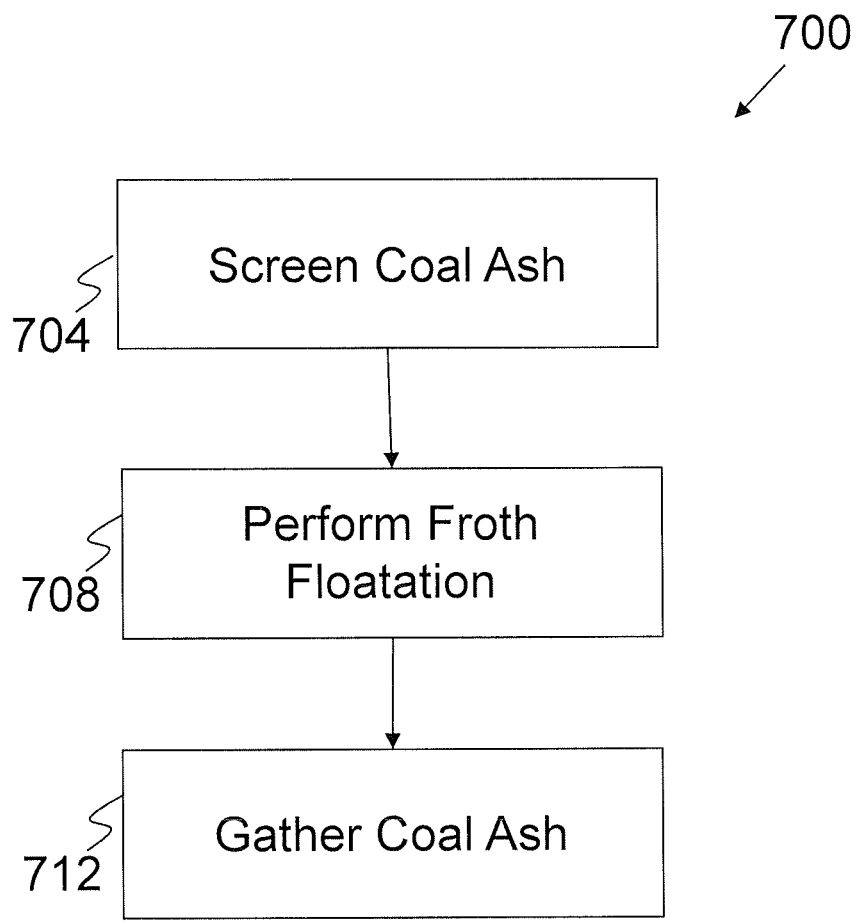
FIG. 7 is flow diagram of a method for sorting coal ash, according to an illustrative embodiment of the invention.

FIG. 7 shows a flow diagram for a method 700 of sorting of coal ash (e.g., Step 604 as described above in FIG. 6), according to an illustrative embodiment of the invention. The method 700 involves screening the coal ash (Step 704). Screening can be performed to collect coal ash of a certain size. In some embodiments, screening is done to collect coal ash that is smaller than a predefined screening size. For example, the predefined screening size can be in the range of −200 to +500 mesh. Screening can be performed utilizing a scalping screen. A scalping screen can have a +60 mesh (e.g., greater than 250 μm). The scalping screen can also have a size of 500 mesh, +200 mesh, +75 mesh, −60 mesh, −75 mesh, −200 mesh and −500 mesh. As apparent to one of ordinary skill in the art, other forms of sorting (e.g., using a vibratory conveyor) can also be performed to collect coal ash of a certain size.

The method 700 also involves preforming froth floatation (Step 708). Froth flotation can be done on the screened coal ash to separate the substantially burned carbon and the substantially unburned carbon. The unburned carbon can be used in the activated carbon market. The method 700 also involves gathering the coal ash (Step 712). Step 712 can involve gathering the coal ash that does not float (e.g., the tailings).

In some embodiments, the tailings from froth flotation are the substantially burned carbon, which are then magnetically treated. Magnetically treating the tailings can be done wet or dry. The substantially magnetic portion can be used as a magnetic substitute in the heavy media coal separation market.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed:

1. A method of recovering rare earth elements from coal ash, the method comprising:
   sorting the coal ash into groups of substantially unburned carbon and substantially burned carbon;
   magnetically treating at least one of the substantially unburned carbon or the substantially burned carbon to cause separation into a substantially magnetic portion and a substantially non-magnetic portion;
   filtering at least one of the substantially magnetic portion or the substantially non-magnetic portion into a substantially course portion and a substantially fine portion;
   treating at least one of the substantially coarse portion or the substantially fine portion with a mineral acid to form an aqueous mineral acid solution;
   extracting the aqueous mineral acid solution to form an organic solution that includes the rare earth salts;
   mixing the organic solution with water to form an aqueous solution that includes the rare earth salts; and
   separating the rare earth salts from the aqueous solution.

2. The method of claim 1, wherein sorting the coal ash further comprises:
   screening the coal ash to collect coal ash that is smaller than a first predefined size;
   performing froth floatation of the screened coal ash; and
   gathering coal ash that does not float.

3. The method of claim 2, wherein screening the coal ash further comprises utilizing a scalping screen.

4. The method of claim 1, wherein the substantially non-magnetic portion of the coal ash is filtered by size.

5. The method of claim 1, wherein filtering comprises cyclone separating.

6. The method of claim 5, wherein cyclone separating removes coal ash that is smaller than a second predefined size.

7. The method of claim 6, wherein the substantially fine portion of the coal ash is smaller than the second predefined size.

8. The method of claim 7, wherein the substantially fine portion of the coal ash is removed and used in a cement substitute market.

9. The method of claim 1, wherein the substantially coarse portion of the coal ash is treated with a mineral acid.

10. The method of claim 1, wherein the mineral acid is nitric acid.

11. The method of claim 1, wherein treating further comprises:
    heating the mineral acid to approximately 90° C.; and
    exposing the substantially coarse portion, the substantially fine portion, or both to the mineral acid for at least one hour.

12. The method of claim 11, wherein exposing the coal ash further comprises additional heating of a resulting solution formed when exposing the coal ash to the mineral acid to generate a more concentrated mixture.

13. The method of claim 1, wherein the extracting the aqueous mineral acid solution further comprises:
    mixing the aqueous mineral acid solution with tributyl phosphate and kerosene; and
    removing the organic solution from the aqueous mineral acid solution such that the rare earth salts are substantially removed along with the organic solution.

14. The method of claim 1, wherein extracting the aqueous mineral acid solution further comprises performing a dry extraction, a liquid extraction, or any combination thereof.

15. The method of claim 14, wherein the dry extraction is a Soxhlet extraction.

16. The method of claim 15, wherein the dry extraction comprises performing continuous extraction of rare earth salts with tributyl phosphate.

17. The method of claim 1, wherein mixing the organic solution comprises performing multiple cycles of mixing the organic solution with water until a concentration level of rare earth salts in the aqueous solution is below a predetermined threshold.

18. The method of claim 1, wherein magnetically treating further comprises ion exchange separation.

19. The method of claim 18, wherein ion exchange separation leads to rare earth element mixtures suitable to be converted to mixtures of rare earth oxides and rare metals.

* * * * *